(12) United States Patent
Abhay et al.

(10) Patent No.: US 7,130,946 B2
(45) Date of Patent: Oct. 31, 2006

(54) CONFIGURATION AND METHOD HAVING A FIRST DEVICE AND A SECOND DEVICE CONNECTED TO THE FIRST DEVICE THROUGH A CROSS BAR

(75) Inventors: Gupta Abhay, Cupertino, CA (US);
Frank Hellwig, München (DE);
Dietmar König, München (DE);
Richard Tuck, Mon Mouthshire (GB)

(73) Assignee: Infineon Technologies AG, Munich (DE)

( * ) Notice: Subject to any disclaimer, the term of this patent is extended or adjusted under 35 U.S.C. 154(b) by 396 days.

(21) Appl. No.: 10/600,554

(22) Filed: Jun. 20, 2003

(65) Prior Publication Data
US 2004/0054843 A1    Mar. 18, 2004

(30) Foreign Application Priority Data
Jun. 20, 2002  (EP) .................................. 02013702

(51) Int. Cl.
*G06F 13/00* (2006.01)
(52) U.S. Cl. ...................................... 710/242; 710/316
(58) Field of Classification Search ................ 710/242, 710/316
See application file for complete search history.

(56) References Cited

U.S. PATENT DOCUMENTS

| | | | | |
|---|---|---|---|---|
| 5,081,575 A * | 1/1992 | Hiller et al. | ............... | 710/317 |
| 5,375,215 A * | 12/1994 | Hanawa et al. | ............. | 711/169 |
| 5,796,977 A * | 8/1998 | Sarangdhar et al. | ........... | 718/1 |
| 5,815,023 A * | 9/1998 | Webber et al. | ............... | 327/407 |
| 5,949,982 A | 9/1999 | Frankeny et al. | | |
| 6,031,842 A * | 2/2000 | Trevitt et al. | ............... | 370/412 |
| 6,173,354 B1 * | 1/2001 | Khandekar et al. | ......... | 710/311 |
| 6,275,890 B1 | 8/2001 | Lee et al. | | |
| 6,292,705 B1 * | 9/2001 | Wang et al. | .................... | 700/5 |
| 6,330,656 B1 * | 12/2001 | Bealkowski et al. | .......... | 712/13 |
| 6,611,908 B1 * | 8/2003 | Lentz et al. | .................. | 712/29 |
| 6,684,268 B1 * | 1/2004 | Paluzzi | ........................ | 710/33 |

(Continued)

FOREIGN PATENT DOCUMENTS

DE          691 18 693 T2          3/1993

(Continued)

OTHER PUBLICATIONS

Tietze/Schenk: "Halbleiter-Schaltungstechnik" [semiconductor circuit technology], *Springer Verlag*, Berlin, 11$^{th}$ ed., 1999, pp. 343-344.

*Primary Examiner*—Paul R. Myers
(74) *Attorney, Agent, or Firm*—Laurence A. Greenberg; Werner H. Stemer; Ralph E. Locher

(57) ABSTRACT

A configuration and method for operating the configuration includes first and second devices connected to one another through a cross bar and accessing one another through the cross bar for reading and/or writing data. When a read access to the second device occurs, the first device reads the data emitted from the second device when it receives a ready signal produced by the second device and supplied to the first device through the cross bar, and, when a write access occurs from the first device to the second device, the first device emits the data to be written to the second device when it receives a ready signal produced by the second device and supplied to the first device through the cross bar and the second device reads the data emitted from the first device when it receives a data valid signal produced by the first device and supplied to the second device through the cross bar.

26 Claims, 2 Drawing Sheets

U.S. PATENT DOCUMENTS 6,751,698 B1 * 6/2004 Deneroff et al. ............ 710/317
6,785,779 B1 * 8/2004 Berg et al. .................. 711/146
6,892,259 B1 * 5/2005 Goodrum et al. ........... 710/244
6,912,612 B1 * 6/2005 Kapur et al. ................ 710/309

FOREIGN PATENT DOCUMENTS

EP        0 534 007 A1    3/1993

* cited by examiner

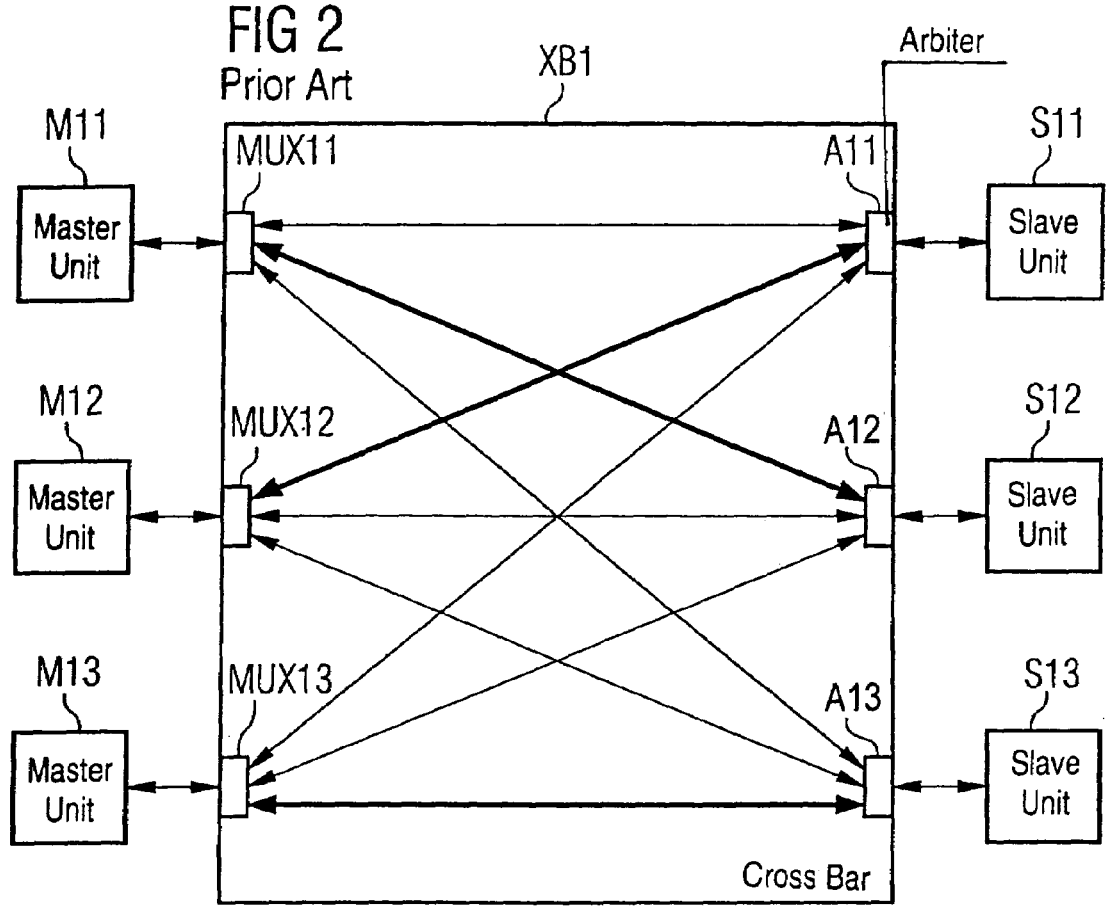

CONFIGURATION AND METHOD HAVING A FIRST DEVICE AND A SECOND DEVICE CONNECTED TO THE FIRST DEVICE THROUGH A CROSS BAR

BACKGROUND OF THE INVENTION

1. Field of the Invention

The present invention relates to a configuration and method having a first device and a second device connected to the first device through a cross bar, in which the first device can access the second device through the cross bar for reading and/or writing.

Such a configuration may, but need not, be entirely or partially a component of a programmable unit such as a microprocessor, microcontroller, signal processor, or the like.

The first device is a device that is referred to in the following text as a master unit and can initiate a transfer of data from or to the second device, that is to say, a read or write access to the second device; the first device may, therefore, be, by way of example, but need not necessarily be, a CPU or a DMA controller of a programmable unit.

The second device is a device that is referred to as a slave unit in the following text and emits data requested by the master unit to the master unit, or receives data supplied to it from the master unit and further processes or stores this data; the second device may, thus, by way of example, but need not necessarily be, a memory.

The master unit and the slave unit need not be connected directly to the cross bar. The connection can also be provided through a bus interface, a bus bridge, or some other interface.

Normally, not only a master unit and a slave unit, but a number of master units and/or a number of slave units, are connected to a cross bar, and can be connected to one another through the cross bar.

The fundamental construction of a configuration such as this is shown in FIG. 2.

The configuration shown in FIG. 2 includes a first master unit M11, a second master unit M12, a third master unit M13, a first slave unit S11, a second slave unit S12, a third slave unit S13, and a cross bar XB1.

The master units M11 to M13 and the slave units S11 to S13 are connected to one another through the cross bar XB1. To be more precise, the connection is done such that the master units M11 to M13 and the slave units S11 to S13 are connected by lines or buses, which are not shown in any more detail in FIG. 2, to associated connections of the cross bar XB1, and such that the connections of the cross bar XB1 to which the master units M11 to M13 are connected are each connected to all the connections to which the slave units S11 to S13 are connected.

In addition to the internal connections that have been mentioned, the cross bar XB1 contains arbiters A11 to A13 and multiplexers MUX11 to MUX13.

The arbiters A11 to A13 are connected upstream of the connections of the cross bar XB1 to which the slave units S11 to S13 are connected. To be more precise, this is done such that:
  the arbiter A11 is connected upstream of that connection of the cross bar XB1 to which the slave unit S11 is connected;
  the arbiter A12 is connected upstream of that connection of the cross bar XB1 to which the slave unit S12 is connected; and
  the arbiter A13 is connected upstream of that connection of the cross bar XB1 to which the slave unit S13 is connected.

The arbiters A11 to A13 monitor whether any of the master units M11 to M13 are requesting a connection for the slave unit that is connected to that connection of the cross bar that is connected upstream of the respective arbiter, and produce a connection between the relevant slave unit and the master unit that has requested the connection, when an appropriate connection request is present and the slave unit is not currently connected to any other master unit or—for whatever reason—must be connected to another master unit prior to this.

The multiplexers MUX11 to MUX13 are connected upstream of those connections of the cross bar XB1 to which the master units M11 to M13 are connected. To be more precise, the connection is done such that:
  the multiplexer MUX11 is connected upstream of that connection of the cross bar XB1 to which the master unit M11 is connected;
  the multiplexer MUX12 is connected upstream of that connection of the cross bar XB1 to which the master unit M12 is connected; and
  the multiplexer MUX13 is connected upstream of that connection of the cross bar XB1 to which the master unit M13 is connected.

The multiplexers MUX11 to MUX13 are controlled by the arbiters A11 to A13, to be precise, in such a manner that data that is emitted from the slave units is in each case supplied to the master unit, to be more precise, only that master unit that has requested the connection for the relevant slave unit.

For the sake of completeness, it should be mentioned that at least those lines by which the master units M11 to M13 request a connection for one of the slave units S11 to S13 are not routed through the multiplexers.

It is also possible for different master units to be connected to different slave units at the same time. For example, the first master unit M11 can be connected to the second slave unit S12, the second master unit M12 can be connected to the first slave unit S11, and the third master unit M13 can be connected to the third slave unit S13 at the same time through those internal connections of the cross bar XB1 that are shown by thicker lines.

The cross bar XB1, thus, allows data to be transmitted very efficiently between the devices connected to it.

However, this is true only when the execution of mutually corresponding actions, which one master unit can request from different slave units, take place from the point of view of the master unit in accordance with the same scheme, in particular, having the same timing.

For example, this is not the case when the master unit receives the data requested from a first slave unit after n clock cycles and receives the data requested from a second slave unit later, that is to say, only after n+m clock cycles. This may occur, for example, when the second slave unit requires a longer time to emit the data requested from it than the first slave unit. If differences such as these are present:
  the special features of the respective slave units, in particular, the reaction times of the slave units, must be set in the master unit to the requirements emitted from the master unit, or
  the cross bar must contain so-called wait state generators, which produce so-called wait states to signal to the master units that the slave unit has not yet reacted to the request from the master unit.

However, this makes the design and operation of the master units and of the cross bar more complex and complicated.

Furthermore, the various reaction times of the slave units to a request from a master unit do not depend only on the design of the slave unit but also on the signal delay times between the master units and the slave units.

The length of the signal delay times depends, inter alia, on the length of the connecting lines between the master units and/or the slave units and the cross bar, thus, the signal delay times may differ considerably from one another. Furthermore, poor signal delay times may make it necessary to insert one or more pipeline stages, in the form of flip-flops for example, in the signal paths between certain master units and the cross bar and/or between certain slave units and the cross bar, and these pipeline stages may result in additional delays in the reaction of the slave units to a request from a master unit.

Additional delays may, furthermore, also occur as a result of the master units and the slave units not being connected directly to the cross bar, through bus interfaces, bus bridges, or the like.

If such additional delays are present, and these delays are also intended to be taken into account by appropriate settings of the master units or of the wait state generators for the cross bar, the design and operation of the master units and of the cross bar becomes even more complex and complicated.

Another solution to the problems caused by the additional delays is for the clock frequency at which the data is transmitted between the devices connected to the cross bar to be reduced sufficiently that the different signal delay times have no effect on the reaction times, and no pipeline stages are required either. However, in this case, the system operates more slowly than the speed at which it could actually operate.

SUMMARY OF THE INVENTION

It is accordingly an object of the invention to provide a configuration having a first device, and a second device that is connected to the first device through a cross bar that overcomes the hereinafore-mentioned disadvantages of the heretofore-known devices and methods of this general type and that finds a possible way in which the components of a configuration of the type described above can cooperate efficiently, and can be combined in a flexible manner, with these components having a simple design and being simple to operate.

With the foregoing and other objects in view, there is provided, in accordance with the invention, a configuration, including a first device, a cross bar, and a second device connected to the first device through the cross bar, the first device accessing the second device through the cross bar to at least one of read data from the second device and write data to the second device. The configuration according to the invention is distinguished by the following:

when a read access to the second device occurs, the first device reads the data emitted from the second device when it receives a ready signal that is produced by the second device and is supplied to the first device through the cross bar; and when a write access occurs from the first device to the second device:

the first device emits the data to be written to the second device when it receives a ready signal that is produced by the second device and is supplied to the first device through the cross bar; and the second device reads the data emitted from the first device when it receives a data valid signal that is produced by the first device and is supplied to the second device through the cross bar.

In such a configuration, the slave unit signals to the master unit, and the master unit signals to the slave unit, that the action in each case expected from the respective unit has been carried out so that the special precautions mentioned initially do not need to be carried out either in the master unit, in the cross bar, or in the slave unit, which makes it possible for the master unit or the slave unit to carry out the actions that must be carried out, or to prevent those actions from being carried out, once a specific state has occurred in the slave unit or in the master unit.

The claimed configuration, thus, allows the components of this configuration to cooperate efficiently and to be combined flexibly, and, the components have a simple design and are simple to operate.

Because most units that can be used as a slave unit intrinsically produce a ready signal or a signal that can be used as a ready signal, or can produce such a signal with little effort, and most units that can be used as a master unit intrinsically produce a data valid signal or a signal that can be used as a data valid signal, or can produce such a signal with little effort, the claimed configuration can, furthermore, even be produced more simply and can be operated more simply than conventional configurations of the type under discussion.

In accordance with another feature of the invention, there are also provided a first address bus, a second address bus, a first read data bus, a second read data bus, a first write data bus, a second write data bus, the first device and the cross bar being connected to one another through the first address bus, the first read data bus, and the first write data bus, and the second device and the cross bar being connected to one another through the second address bus, the second read data bus, and the second write data bus.

In accordance with a further feature of the invention, the first device sends a request signal to the cross bar when the first device wishes to make a read access to the second device.

In accordance with an added feature of the invention, the first device sends an address to the cross bar at the same time as the request signal, the address specifying a device and a point within the device from which data should be read.

In accordance with an additional feature of the invention, the second device is a plurality of second devices and the first device sends an address to the cross bar at the same time as the request signal, the address specifying one of the second devices and a point within the one second device from which data should be read.

In accordance with yet another feature of the invention, the first device transmits the request signal and the address to the cross bar through the first address bus.

In accordance with yet a further feature of the invention, the cross bar confirms the read access request by transmission of a grant signal to the first device.

In accordance with yet an added feature of the invention, the cross bar transmits the grant signal to the first device through the first address bus.

In accordance with yet an additional feature of the invention, the cross bar passes on at least a portion of the address supplied to the cross bar through the second address bus to the device from which data should be read.

In accordance with again another feature of the invention, the second device emits to the cross bar the data stored at the address supplied to the second device.

In accordance with again a further feature of the invention, the second device emits the ready signal to the cross bar at the same time that the second device emits the data that has been read.

In accordance with again an added feature of the invention, the second device transmits the data that has been read and the ready signal to the cross bar through the second read data bus.

In accordance with again an additional feature of the invention, the cross bar passes on the data supplied thereto and the ready signal supplied thereto through the first read data bus to the first device.

In accordance with still another feature of the invention, the first device sends a request signal to the cross bar when the first device wishes to make a write access to the second device.

In accordance with still a further feature of the invention, the first device sends an address to the cross bar at the same time as the request signal, the address specifying a device and a point within the device to which data should be written.

In accordance with still an added feature of the invention, the first device transmits the request signal and the address to the cross bar through the first address bus.

In accordance with still an additional feature of the invention, the cross bar confirms the write access request from the first device by transmitting a grant signal to the first device.

In accordance with another feature of the invention, the cross bar transmits the grant signal to the first device through the first address bus.

In accordance with a further feature of the invention, the cross bar passes on at least a portion of the address supplied to the cross bar through the second address bus to the device to which data should be written.

In accordance with an added feature of the invention, the second device emits a ready signal to the cross bar when the second device is ready to receive the data to be stored in the second device.

In accordance with an additional feature of the invention, the second device transmits the ready signal to the cross bar through the second read data bus.

In accordance with yet another feature of the invention, the cross bar passes on the ready signal to the first device through the first read data bus.

In accordance with yet a further feature of the invention, the first device emits to the cross bar the data to be written to the second device.

In accordance with yet an added feature of the invention, the first device emits the data valid signal to the cross bar at the same time that the first device emits the data to be written to the second device.

In accordance with yet an additional feature of the invention, the first write data bus transmits the data emitted from the first device and the data valid signal emitted from the first device to the cross bar.

In accordance with a concomitant feature of the invention, the cross bar passes on the data and the data valid signal supplied to the cross bar to the second device through the second write data bus.

With the objects of the invention in view, there is also provided a method for at least one of reading and writing data, including the steps of connecting a second device to a first device through a cross bar, accessing the second device with the first device through the cross bar for at least one of reading and writing data, when a read access to the second device occurs, reading the data emitted from the second device with the first device when the first device receives a ready signal produced by the second device and supplied to the first device through the cross bar, and, when a write access from the first device to the second device occurs emitting, from the first device, the data to be written to the second device when the first device receives a ready signal produced by the second device and supplied to the first device through the cross bar and reading the data emitted from the first device with the second device when the second device receives a data valid signal produced by the first device and supplied to the second device through the cross bar.

With the objects of the invention in view, there is also provided a configuration, including a first means for reading and writing, a cross bar, a second means for reading and writing connected to the first read/write means through the cross bar, the first read/write means accessing the second read/write means through the cross bar to at least one of read data from the second read/write means and write data to the second read/write means, upon the occurrence of a read access to the second read/write means, the first read/write means reading the data emitted from the second read/write means upon receipt of a ready signal produced by the second read/write means and supplied to the first read/write means through the cross bar, and, upon the occurrence of a write access from the first read/write means to the second read/write means the first read/write means emitting the data to be written to the second read/write means upon receipt by the first read/write means of a ready signal produced by the second read/write means and supplied to the first read/write means through the cross bar and the second read/write means reading the data emitted from the first read/write means upon receipt by the second read/write means of a data valid signal produced by the first read/write means and supplied to the second read/write means through the cross bar.

Other features that are considered as characteristic for the invention are set forth in the appended claims.

Although the invention is illustrated and described herein as embodied in a configuration and method having a first device, and a second device that is connected to the first device through a cross bar, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 2 is a block circuit diagram of a prior art configuration.

DESCRIPTION OF THE PREFERRED EMBODIMENTS

Figure 1:
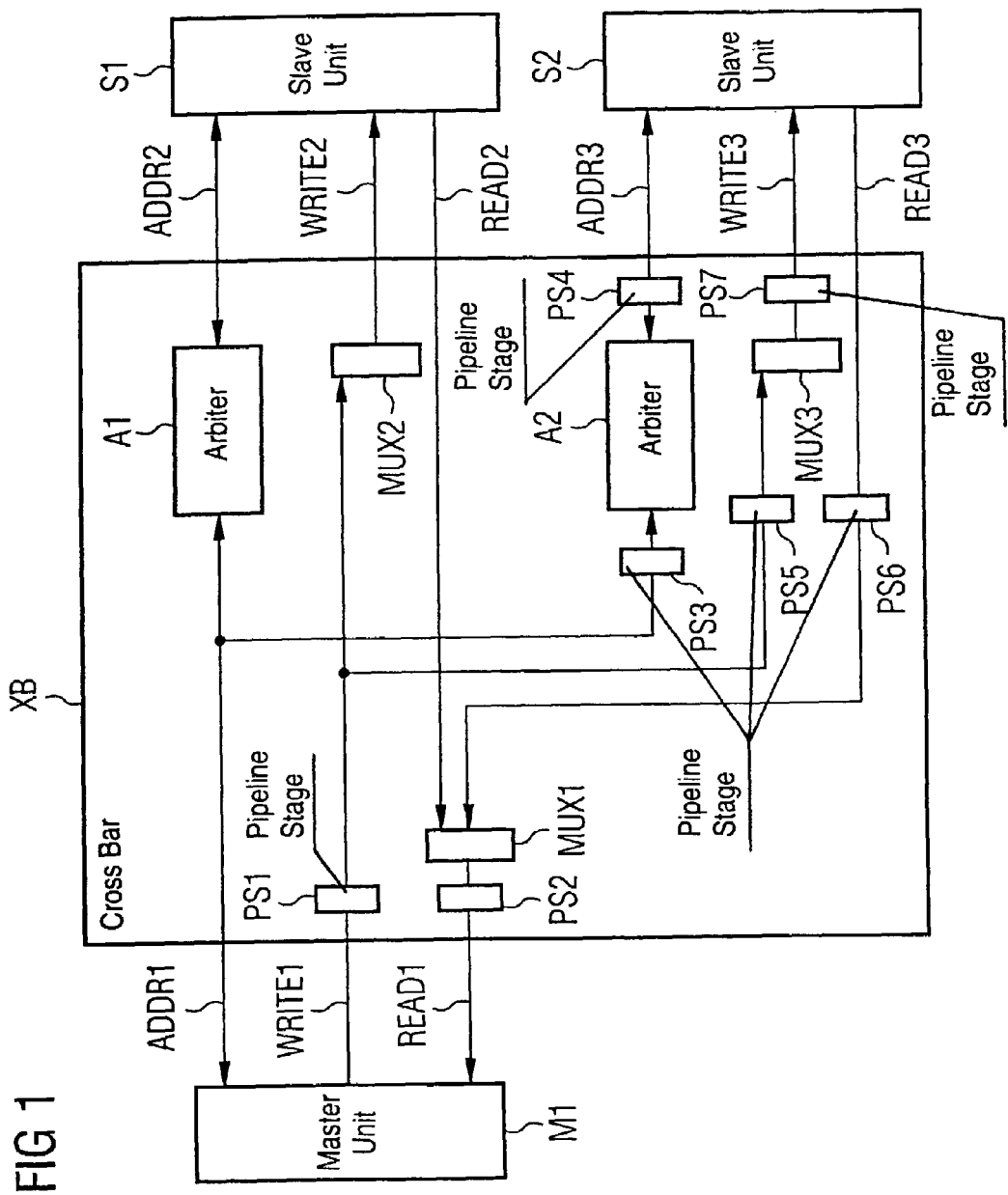
FIG. 1 is a block circuit diagram of a configuration according to the invention.

The configuration described in the following text is, in principle, configured in the same way as the configuration illustrated in FIG. 2 and described initially with reference to FIG. 2. This means that the configuration according to the invention has at least one master unit, at least one slave unit, and a cross bar connecting these units to one another. FIG. 1, with reference to which the configuration introduced here will be described, shows only one master unit and two slave units, in contrast to FIG. 2, for the sake of clarity.

Each of the available master units can access (through the cross bar) at least one of the slave units. In the example under consideration, the accesses are read accesses, by which a master unit reads from a slave unit data stored in that slave unit, and write accesses by which a master unit transmits to the slave unit data to be stored or to be further processed in that slave unit. The accesses that the master units make to the slave units may, however, also be any other desired types of access.

The described configuration in the example under consideration is a component of a programmable unit such as a microprocessor, microcontroller, or signal processor. However, there is no restriction to such embodiments. In particular, certain master units and/or slave units may at least partially also be provided outside the programmable unit and, furthermore, the described configuration may also entirely or partially be a component of an integrated or non integrated circuit.

As in the case of the conventional configuration described initially, it is also true in the case of the configuration described in the following text that the master units and the slave units need not be connected directly to the cross bar, but may also be connected to the cross bar through a bus interface, a bus bridge, or the like.

The configuration described in the following text has a number of differences in comparison to the configuration described initially with reference to FIG. 2, and these will now be described with reference to FIG. 1.

Referring now to the figures of the drawings in detail and first, particularly to FIG. 1 thereof, there is shown a master unit M1, a first slave unit S1, a second slave unit S2, and a cross bar XB.

The cross bar XB contains arbiters A1 and A2, multiplexers MUX1, MUX2 and MUX3, as well as pipeline stages PS1 to PS7, with the pipeline stages PS1 to PS7 in the example under consideration being formed by registers, to be more precise, by flipflops, although they could also be implemented in any other desired way. The configuration and the operation of the components of the cross bar XB will be described in more detail below.

The master unit M1 and the slave units S1 and S2 are connected to one another through the cross bar XB. To be more precise, the connection is accomplished such that:
  the master unit M1:
    is connected through a first address bus ADDR1 to an input connection of the arbiter A1 and to an input connection of the arbiter A2;
    is connected through a first write data bus WRITE1 to an input connection of the multiplexer MUX2 and to an input connection of the multiplexer MUX3; and
    is connected through a first read data bus READ1 to the output connection of the multiplexer MUX1;
  the slave unit S1:
    is connected through a second address bus ADDR2 to the output connection of the arbiter A1;
    is connected through a second write data bus WRITE2 to the output connection of the multiplexer MUX2; and
    is connected through a second read data bus READ2 to an input connection of the multiplexer MUX1; and
  the slave unit S2:
    is connected through a third address bus ADDR3 to the output connection of the arbiter A2;
    is connected through a third write data bus WRITE3 to the output connection of the multiplexer MUX3; and
    is connected through a third read data bus READ3 to an input connection of the multiplexer MUX1.

A further master unit would:
  be connected through a fourth address bus to a further input connection of the arbiter A1 and to a further input connection of the arbiter A2,
  be connected through a fourth write data bus to a further input connection of the multiplexer MUX2 and to a further input connection of the multiplexer MUX3, and
  be connected through a fourth read data bus to the output connection of a further multiplexer, whose input connections are connected to the read data buses READ1 and READ2.

Expressed in general form, the connections are accomplished such that:
  a multiplexer associated with the relevant master unit is provided for each of the master units connected to the cross bar; and
  an arbiter associated with the relevant slave unit and a multiplexer associated with the relevant slave unit are provided for each of the slave units connected to the cross bar,
with:
  the multiplexer associated with each master unit:
    connecting the input connections through read data buses to all the slave units that are present; and
    connecting the output connection through a read data bus to the master unit;
  the multiplexer associated with each slave unit:
    connecting the input connections through write data buses to all the master units that are present; and
    connecting the output connection through a write data bus to the slave unit; and
  the arbiter associated with each slave unit:
    connecting the input connections through address buses to all the master units that are present; and
    connecting the output connection through an address bus to the slave unit.

The multiplexers that are present are controlled by the arbiters.

Addresses that are emitted from the master units as well as various control signals that will be described in more detail later on are transmitted through the address buses.

Data emitted from the slave units as well as various control signals that will, likewise, be described in more detail later on are transmitted through the read data buses.

Data emitted from the master units as well as various control signals that will, likewise, be described in more detail later on are transmitted through the write data buses.

The master units that are connected to the cross bar XB can access the slave units for reading and/or writing. A read access to a slave unit allows the master unit to read data stored in that slave unit; a write access to a slave unit allows the master unit to transmit data to be stored or further processed in the slave unit to that slave unit.

The procedures that take place during a read access and the procedures that take place during a write access will be described in more detail in the following text with reference to FIG. 1.

In the case of the read access that is described first of all, it is assumed that the master unit M1 wishes to read data from the slave unit S1.

The read access, thus, starts with the master unit M1 emitting an address, a read signal, and a request signal through the address bus ADDR1, with the master unit M1:

using the request signal to signal that it wishes to access one of the slave units;

using the read signal to signal that it wishes to read data from the relevant slave unit; and using the address to indicate the slave unit or the point within the relevant slave unit from which data should be read.

The address, the read signal, and the request signal are supplied through the address bus ADDR1 both to the arbiter A1 and to the arbiter A2. Each of the arbiters A1 and A2 uses the request signal to identify that a master unit is requesting an access, and, then, uses the address to check whether the access is intended to be made to the slave unit that is associated with the respective arbiter. In such a case, the arbiter A1 finds that the requested access is intended to be made to the slave unit S1 that is associated with that arbiter A1; the arbiter A2 finds that no access is intended to be made to the slave unit S2 that is associated with that arbiter A2. Once the arbiter A1 has found that a master unit wishes to access the slave unit S1, the arbiter A1, first of all, emits a grant signal through the address bus to that master unit that has requested access to that slave unit S1; the master unit that has requested access can be determined based upon the address bus through which the request signal requesting access was transmitted. Thus, in the example under consideration, the arbiter A1 transmits a grant signal through the address bus ADDR1 to the master unit M1.

The master unit M1 uses the grant signal supplied to it to identify that its access request has been accepted, and, now, waits for the transmission of the data requested from the slave unit S1. The master unit has no information as to when this data will be supplied, and the master unit is also not signaled by wait state cycles or the like that the data requested from the slave unit S1 is not yet available. Instead, the master unit waits until it is supplied with a ready signal, which will be described in more detail later on.

After emitting the grant signal to the master unit M1, or even at the same time as this, the arbiter A1 checks whether or not the slave unit S1 can be accessed at that time. This is the situation when the slave unit is not already being accessed at that time and when there are no access requests to be processed in advance. Access requests that are to be processed in advance may, by way of example, be access requests that arrived at the arbiter A1 earlier, or that have a higher allocated priority than the present access request.

If the arbiter A1 finds that the access requested by the master unit M1 to the slave unit S1 can be carried out, the arbiter A1 transmits the read signal and that part of the address that is required for addressing that slave unit S1 through the address bus ADDR2 to the slave unit S1.

Substantially at the same time, the arbiter A1 actuates the multiplexer MUX1 such that it passes on the data supplied to it from the slave unit S1 through the read data bus READ2 to the master unit M1, through the read data bus READ1. In addition, it is possible to provide for the arbiter A1 to actuate the multiplexer MUX2 such that the latter passes on the data supplied to it from the master unit M1 through the write data bus WRITE1 to the slave unit S1 through the write data bus WRITE2.

The slave unit S1 uses the data supplied to it through the address bus ADDR2 to identify that slave unit S1 should read and emit the data stored at the address supplied thereto. It, then, reads the data to be read, and emits this data together with a ready signal through the read data bus READ2. The data transmitted through the read data bus READ1 is passed on through the multiplexer MUX1 and the read data bus READ1 to the master unit M1.

As has already been explained above, the master unit M1 waits to receive the ready signal. The ready signal signals to the master unit M1 that the data already requested by the master unit M1 from the slave unit S1 is available and can, now, be read. The master unit M1 reads the data supplied to it through the read data bus READ1, thus ending the read access process.

In the example under consideration, the master unit M1 had to wait to receive the ready signal, that is to say, in the meantime, it did not carry out any further access to one of the slave units. However, the master unit can make further accesses to the slave units even before reception of the ready signal. In particular, it is feasible without any problems for the master unit M1 to request further accesses to the slave unit that it is currently accessing, even before receiving the ready signal. This means that, even before the termination of an access to the slave unit S1, the master unit M1 can make one or more further accesses to that slave unit S1.

Because the master unit M1 is caused to receive a ready signal, which is produced by the slave unit and is passed on through the cross bar XB to the master unit, in order to read the data emitted from the slave unit, there is no need:

for the master unit to be informed of this information that has been set, defining the time at which the data emitted from the slave unit S1 should be read; or for a wait state generator to be provided in the cross bar, or anywhere else, which signals to the master unit by producing wait state cycles that the data requested from the slave unit S1 is not yet available for reading.

This, in turn, makes it possible for any desired number of pipeline stages to be inserted at any desired points, completely independently of one another, in the buses through which the units connected to the cross bar are connected to the cross bar, without any need for this to be taken into account in the design and configuration of the master unit M1 and of the cross bar XB. FIG. 1 shows one possible configuration of pipeline stages. As has already been mentioned above, the pipeline stages are annotated by the reference symbols PS1 to PS7. The pipeline stages may also be provided outside of the cross bar.

The pipeline stages result in the data and signals that are transmitted through the data and signal paths that contain the pipeline stages being transmitted delayed by one or more clock signal periods. However, in the case of the configuration that is illustrated in FIG. 1 and is described with reference to FIG. 1, such a process cannot interfere with correct operation of the configuration in any circumstances. The master unit M1 reads the data supplied thereto from the slave unit S1 when the master unit M1 receives the ready signal that is transmitted at the same time as the data so that it is irrelevant how long it takes between requesting access to the slave unit S1 or receiving the grant signal and the reception of the data requested from the slave unit.

A corresponding situation also arises, of course, when the master unit M1 wishes to read data from another of the slave units that are present, or when another of the master units that are present wishes to read data from one slave unit.

A similar situation occurs when the master unit M1 makes a write access to the slave unit S1, that is to say, when the master unit M1 transmits to the slave unit S1 data to be stored in the slave unit S1 or to be further processed in the slave unit S1.

The write access starts with the master unit M1 emitting through the address bus ADDR1 an address, a write signal, and a request signal, with the master unit M1:

- signaling by the request signal that it wishes to access one of the slave units;
- signaling by the write signal that it wishes to write data to the relevant slave unit; and
- indicating by the address the slave unit or the point within the relevant slave unit to which the data should be written.

The address, the write signal, and the request signal are supplied through the address bus ADDR1 both to the arbiter A1 and to the arbiter A2. Each of the arbiters A1 and A2 uses the request signal to identify that a master unit has requested access, and, then, uses the address to check whether the access is intended to be made to the slave unit that is associated with the respective arbiter. In such a case, the arbiter A1 finds that the requested access is intended to be made to the slave unit S1 that is associated with the arbiter A1; the arbiter A2 finds that no access is intended to be made to the slave unit S2 that is associated with that arbiter A2.

Once the arbiter A1 has found that a master unit wishes to access the slave unit S1, it, first of all, emits, through the address bus, a grant signal to that master unit that has requested access to the slave unit S1; the master unit that has requested access can be determined based upon the address bus through which the request signal requesting access was transmitted. Thus, in the example under consideration, the arbiter A1 transmits a grant signal through the address bus ADDR1 to the master unit M1.

The master unit M1 uses the grant signal supplied thereto to identify that its access request has been received, and, now, waits until it can emit the data to the slave unit S1 that it wishes to store in that slave unit S1. The master unit has no information about the time at which this can be done, and the master unit M1 is also not signaled by wait state cycles or the like that the relevant time has not yet been reached. Instead, the master unit M1 waits until it is supplied with a ready signal, which will be described in more detail later on.

After emitting the grant signal to the master unit M1, or even at the same time as this, the arbiter A1 checks whether access is currently possible to the slave unit S1. This is the case where no access is currently being made to the slave unit and when there are no access requests that need to be dealt with in advance. Access requests that need to be dealt with in advance may, for example, be access requests that arrived at the arbiter A1 earlier, or that have a higher associated priority than the current access request.

If the arbiter A1 finds that the access requested by the master unit M1 to the slave unit S1 can be carried out, it transmits the write signal and that part of the address that is required for addressing the slave unit S1, through the address bus ADDR2 to the slave unit S1.

Substantially at the same time:

- the arbiter A1 actuates the multiplexer MUX1 such that it passes on the data supplied to it from the slave unit S1 through the read data bus READ2, through the read data bus READ1, to the master unit M1; and
- the arbiter A1 actuates the multiplexer MUX2 such that it passes on the data supplied to it from the master unit M1 through the write data bus WRITE1, through the write data bus WRITE2, to the slave unit S1.

The slave unit S1 uses the data supplied to it through the address bus ADDR2 to identify that data should be stored at the address supplied to it. The slave unit S1, then, emits a ready signal on the read data bus READ2. This signal is passed through the multiplexer MUX1 and the read data bus READ2 to the master unit M1.

As has already been explained above, the master unit M1 waits to receive the ready signal. The ready signal signals to the master unit M1 that the master unit M1 may, now, emit the data to be written to the slave unit S1. The master unit M1, then, emits the data to be written to the slave unit S1, together with a data valid signal, through the write data bus WRITE1. This data is passed through the multiplexer MUX2 and the write data bus WRITE2 to the slave unit S1. The slave unit S1 uses the data valid signal to identify that the data to be written to it is available. The slave unit S1 reads this data, and stores the data or processes the data further. This completes the write access by the master unit M1 to the slave unit S1.

In the example under consideration, the master unit M1 had to wait to receive the ready signal, that is to say, in the meantime, it did not make any further access to one of the slave units. However, even before receiving the ready signal, the master unit can make further accesses to the slave units. In particular, it is possible, without any problems, for the master unit M1 to request further accesses to the slave unit that it is currently accessing, even before receiving the ready signal. This means that, even before completion of an access to the slave unit S1, the master unit M1 may request one or more further accesses to the slave unit S1.

Because the master unit M1 is caused to receive a ready signal, which is produced by the slave unit and is passed on through the cross bar XB to the master unit, in order to emit the data to be written to the slave unit S1, there is no need:

- for the master unit to be informed of this information that has been set, defining the time at which the data emitted from the slave unit S1 should be read; or
- for a wait state generator to be provided in the cross bar, or anywhere else, which signals to the master unit by producing wait state cycles that the data to be written to the slave unit S1 is not yet to be emitted.

This, in turn, makes it possible for any desired number of pipeline stages to be inserted at any desired points, completely independently of one another, in the buses through which the units connected to the cross bar are connected to the cross bar, without any need for this to be taken into account in the design and configuration of the master unit M1 and of the cross bar XB. FIG. 1 shows one possible configuration of pipeline stages. As has already been mentioned above, the pipeline stages are annotated by the reference symbols PS1 to PS7. The pipeline stages may also be provided outside of the cross bar.

The pipeline stages result in the data and signals that are transmitted through the data and signal paths that contain the pipeline stages being transmitted delayed by one or more clock signal periods. However, in the case of the configuration that is illustrated in FIG. 1 and is described with reference to FIG. 1, this cannot interfere with correct operation of the configuration in any circumstances. On reception of the ready signal, the master unit M1 emits the data to be written to the slave unit S1 so that it is irrelevant how long it takes between the request for access to the slave unit S1 or the reception of the grant signal and the emission of the data to be written to the slave unit.

A corresponding situation also arises, of course, when the master unit M1 wishes to write data to another of the slave units that are present, or when another of the master units that are present wishes to write data to a slave unit.

The described configuration can be implemented and operated in a simple manner, and allows the devices that are connected to one another through the cross bar to cooperate efficiently, and to be combined in a flexible manner.

We claim:

1. A configuration, comprising:
   at least one first device;
   a cross bar;
   at least one second device connected to said at least one first device through said cross bar, said at least one first device accessing said at least one second device through said cross bar to at least one of read data from said at least one second device and write data to said at least one second device;
   a first multiplexer associated with each of said at least one first device, each first multiplexer having input connections connecting directly or via a pipeline stage to all of said at least one second device through read data buses and an output connection connecting to the associated one of said at least one first device through a read data bus;
   an arbiter associated with each of said at least one second device, each arbiter having input connections connecting directly or via a pipeline stage to all of said at least one first device through address buses and an output connection connecting to the associated one of said at least one second device through an address bus; and
   a second multiplexer associated with each of said at least one second device, each second multiplexer having input connections connecting directly or via a pipeline stage to all of said at least one first device through write data buses and an output connection connecting to the associated one of said at least one second device through a write data bus;
   wherein said pipeline stage is not one of said first multiplexers, one of said arbiters, or one of said second multiplexers.

2. The configuration according to claim 1, further comprising:
   at least one first address bus;
   at least one second address bus;
   at least one first read data bus;
   at least one second read data bus;
   at least one first write data bus;
   at least one second write data bus;
   each of said at least one first device and said cross bar being connected to one another through a respective one of said at least one first address bus, a respective one of said at least one first read data bus, and a respective one of said at least one first write data bus; and
   each of said at least one second device and said cross bar being connected to one another through a respective one of said at least one second address bus, a respective one of said at least one second read data bus, and a respective one of said at least one second write data bus.

3. The configuration according to claim 2, wherein one of said at least one first device sends a request signal to said crass bar when said first device wishes to make a read access to one of said at least one second device.

4. The configuration according to claim 3, wherein said first device sends an address to said cross bar at the same time as the request signal, said address specifying a second device and a point within said second device from which data should be read.

5. The configuration according to claim 4, wherein said first device transmits the request signal and the address to said cross bar through a respective first address bus.

6. The configuration according to claim 3, wherein said cross bar confirms the read access request by transmission of a grant signal to said first device.

7. The configuration according to claim 6, wherein said cross bar transmits the grant signal to said first device through a respective first address bus.

8. The configuration according to claim 4, wherein said cross bar passes on at least a portion of the address supplied to said cross bar through a respective second address bus to said second device from which data should be read.

9. The configuration according to claim 8, wherein said second device emits to said cross bar the data stored at the address supplied to said second device.

10. The configuration according to claim 9, wherein said second device emits the ready signal to said cross bar at the same time that said second device emits the data that has been read.

11. The configuration according to claim 10, wherein said second device transmits the data that has been read and the ready signal to said cross bar through a respective second read data bus.

12. The configuration according to claim 11, wherein said cross bar passes on the data supplied thereto and the ready signal supplied thereto through a respective first read data bus to said first device.

13. The configuration according to claim 2, wherein one of said at least one first device sends a request signal to said cross bar when said first device wishes to make a write access to one of said at least one second device.

14. The configuration according to claim 13, wherein said first device sends an address to said cross bar at the same time as the request signal, the address specifying a second device and a point within said second device to which data should be written.

15. The configuration according to claim 14, wherein said first device transmits the request signal and the address to said cross bar through a respective first address bus.

16. The configuration according to claim 13, wherein said cross bar confirms the write access request from said first device by transmitting a grant signal to said first device.

17. The configuration according to claim 16, wherein said cross bar transmits the grant signal to said first device through a respective first address bus.

18. The configuration according to claim 14, wherein said cross bar passes on at least a portion of the address supplied to said cross bar through a respective second address bus to said second device to which data should be written.

19. The configuration according to claim 18, wherein said second device emits a ready signal to said cross bar when said second device is ready to receive the data to be stored in said second device.

20. The configuration according to claim 19, wherein said second device transmits the ready signal to said cross bar through a respective second read data bus.

21. The configuration according to claim 20, wherein said cross bar passes on the ready signal to said first device through a respective first read data bus.

22. The configuration according to claim 21, wherein said first device emits to said cross bar the data to be written to said second device.

23. The configuration according to claim 22, wherein said first device emits the data valid signal to said cross bar at the same time that said first device emits the data to be written to said second device.

24. The configuration according to claim 23, wherein a respective first write data bus transmits the data emitted from said first device and the data valid signal emitted from said first device to said cross bar.

25. The configuration according to claim 24, wherein said cross bar passes on the data and the data valid signal supplied to said cross bar to said second device through a respective second write data bus.

26. A method for at least one of reading and writing data, which comprises:

connecting at least one second device to at least one first device through a cross bar;

accessing one of the at least one second device with one of the at least one first device through the cross bar for at least one of reading and writing data;

associating a first multiplexer with each of the at least one first device, each first multiplexer having input connections connecting directly or via a pipeline stage to all of the at least one second device through read data buses and an output connection connecting to the associated one of the at least one first device through a read data bus;

associating an arbiter with each of the at least one second device, each arbiter having input connections connecting directly or via a pipeline stage to all of the at least one first device through address buses and an output connection connecting to the associated one of the at least one second device through an address bus;

associating a second multiplexer with each of the at least one second device, each second multiplexer having input connections connecting directly or via a pipeline stage to all of the at least one first device through write data buses and an output connection connecting to the associated one of the at least one second device through a write data bus wherein the pipeline stage is not one of the first multiplexers, one of the arbiters, or one of the second multiplexers.

* * * * *